Figure 1:
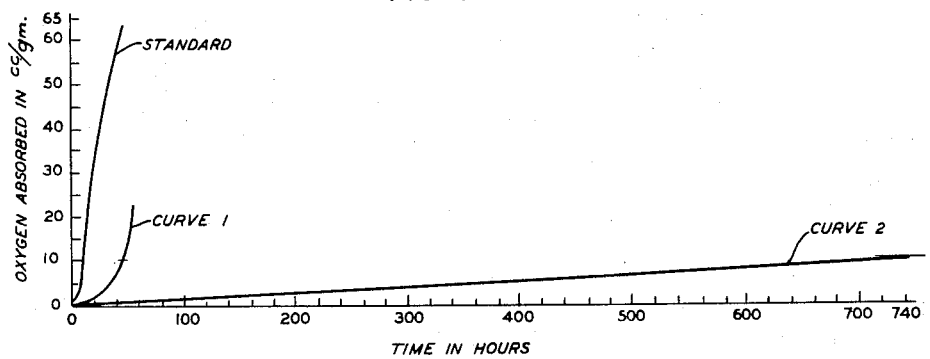

Jan. 10, 1961     W. L. HAWKINS ET AL     2,967,847
ALPHA OLEFIN HYDROCARBONS STABILIZED WITH CARBON
BLACK AND A COMPOUND HAVING R-S-S-R STRUCTURE
Filed Nov. 29, 1956

INVENTORS
W. L. HAWKINS
V. L. LANZA
F. H. WINSLOW

BY

ATTORNEY

United States Patent Office 2,967,847
Patented Jan. 10, 1961

2,967,847

ALPHA OLEFIN HYDROCARBONS STABILIZED WITH CARBON BLACK AND A COMPOUND HAVING R-S-S-R STRUCTURE

Walter L. Hawkins, Montclair, Vincent L. Lanza, Summit, and Field H. Winslow, Springdale, N.J., assignors to Bell Telephone Laboratories, Incorporated, New York, N.Y., a corporation of New York Filed Nov. 29, 1956, Ser. No. 625,108

6 Claims. (Cl. 260—41)

This invention relates to the stabilization of polymeric material against thermal oxidation and oxidation induced by ultraviolet absorption. The polymeric materials which are protected in accordance with this invention are all essentially saturated hydrocarbon polymers containing tertiary hydrogen atoms and include that class of such polymers in which the tertiary hydrogen atoms occur in ordered fashion such as in polypropylene and that class in which they occur in random fashion such as in polyethylene. This invention is directed both to the process by which such polymeric materials are stabilized against these influences and to the stabilized products so produced.

In accordance with this invention, stabilization against oxidative degradation from the above influences is afforded by incorporation in the polymer of small amounts of a new class of retarder materials together with small amounts of dispersed carbon black particles.

Polymeric materials which are effectively stabilized by this invention include such materials as polymers of ethylene, propylene, butene-1, 3-methyl pentene-1 and copolymers and mixtures including any of these materials. The most common of these materials are polymerized products of monomers containing four or fewer carbon atoms, and it is primarily in terms of such polymers that the invention is described. However, attention is now being directed to polymerized products of higher order monomers such as, for example, polyhexene and in such polymerized products containing tertiary hydrogen atoms, protection is afforded equally well in accordance with this invention. The most common of the polymeric materials listed above at this time is polyethylene. Some of the other materials listed such as polypropylene are known to have excellent electrical and mechanical properties and will doubtless find widespread use in the near future.

Many of the most important applications of polyethylene, such as its use in cable sheathings, depend upon its very good mechanical properties, such as high tensile strength and abrasion resistance coupled with its resistant properties against water and water vapor. Other uses take advantage of its high dielectric strength in applications such as primary insulation of wire conductors.

Unfortunately, however, polymeric materials of the class set forth above are subject to deterioration from sunlight and heat, both of which induce autocatalytic oxidation and breakdown of the long chain polymeric structure, thereby impairing tensile strength, low temperature brittleness and dielectric properties. For a discussion of the oxidation and breakdown of polymeric materials containing tertiary hydrogen atoms see "Modern Plastics," volume 31, pages 121–124, September 1953.

As is known, the most important degradative influences affecting such polymeric materials are oxidative deterioration induced by ultraviolet absorption and deterioration resulting from oxidation independent of ultraviolet absorption. Both of these influences are primarily due to the same oxidation mechanism. For the purposes of this description, the former influence is here referred to as "ultraviolet oxidation" while the latter is referred to as "thermal oxidation." As the term implies, the latter mechanism is accelerated by an increase in temperature. While the former mechanism is of chief concern in outdoor installations of the finished product, thermal oxidation is also of concern during any high temperature manufacturing procedure, such as the extrusion of wire insulation.

It was discovered some time ago by workers in the field that effects due to ultraviolet absorption could be effectively avoided by the incorporation into the polymer of small amounts of finely dispersed particles of carbon black. Effective light shielding from ultraviolet emission is afforded by the incorporation into the polymer of from about .05 percent to about 5 percent by weight, and usually about 3 percent, of carbon black particles of the order of somewhat less than 1000 angstroms in size. Many types of carbon black are commercially available for this purpose and their use is widespread. Any such materials are effective in combination with the retarders of this invention in producing a stabilized polymeric product.

The deleterious degradative effect of thermal oxidation on polymers, such as polyethylene and polypropylene has also received considerable attention by researchers in the field. Effective "antioxidants" developed for this purpose are generally phenols or secondary amines of aromatic compounds which may, in addition to the amino or phenolic grouping, contain as an additional ring substituent a branched or normal aliphatic radical generally containing three or more carbon atoms. As is well known, a general requirement of such antioxidants is that they contain an antioxidant group such as the secondary amino or phenolic group attached to an aromatic ring, the compound having such a structure that its resulting radical is stabilized by resonance energy. Much consideration has been given such antioxidants in the texts, see, for example, G. W. Wheland's "Advanced Organic Chemistry," 2nd edition, chapters 9 and 10.

However, even though it has been known for some time that ultraviolet degradation may be effectively prevented by the use of a dispersion of carbon black particles, and even though thermal oxidative degradation may be avoided by the use of any of several antioxidants commercially available for this purpose, a further difficulty has been encountered in attempts to prepare polymeric compositions which are at the same time stabilized against both influences. In view of the knowledge that certain carbon blacks when incorporated into essentially saturated hydrocarbon polymers have a mild antioxidant effect in addition to shielding the substance against ultraviolet radiation, it was expected that the incorporation of known antioxidants into polymeric materials containing such carbon blacks would result in increased stability against thermal oxidation. It was discovered, however, that, not only is the effect of the presence of such antioxidants and carbon black in the polymer not additive, but that the effectiveness of the antioxidant in the presence of carbon black is reduced several fold, and in many instances, is rendered completely ineffectual in that such a product has no more resistance against thermal oxidative degradation than does a sample containing no thermal antioxidant whatever.

In accordance with the disclosure herein, we have discovered a class of materials which when combined with carbon black in any of the polymeric materials under consideration results in a stabilized product which compares favorably with such polymeric materials in which have been incorporated the most effective commercially available antioxidants and which contain no carbon black. These new materials, which are for the most part completely ineffectual in the absence of carbon black, appear to owe their effectiveness to a different mechanism than that of the commercially available antioxidants.

The retarder materials of this invention are all aliphatic disulphides falling within the general formula $$(R\text{—}S\text{—}S\text{—}R')_x$$

in which R and R' are aliphatic radicals such, for example, as butyl or higher order homologs of the alkyl series and in which one or more hydrogen atoms may be replaced by a hydrocarbon substituent or other substituent, such as nitrogen known to be inert with respect to the polymer to be stabilized, and $x$ is an integer of at least one. The R and R' moieties of these compounds may be identical or not, the only requirement additional to those set forth being a restriction of the number of carbon atoms in each moiety including substituents in the exclusive range of from 4 to 30. The lower limit of 4 carbon atoms is necessitated by the high vapor pressure of compounds of this class containing fewer carbons resulting in practical difficulty in introducing the material into the polymer, while the upper limit of 30 carbons is directed primarily to ease of compounding the polymeric materials and to dilution of the antioxidant effect based on the weight percentage range which is practical.

From the general formula above, it is seen that the retarder materials of this invention include dimer and higher order polymers containing two or more of the R—S—S—R' units. Such a compound may be synthesized by the iodine titration or other oxidation of an aliphatic dithiol, such as decamethylene dithiol.

Examples of retarder materials within the scope of this invention are:

| | |
|---|---|
| Butyl disulfide | Hexadecyl disulfide |
| Hexyl disulfide | Octadecyl disulfide |
| Heptyl disulfide | Cetyl disulfide |
| Octyl disulfide | Tetracosyl disulfide |
| Nonyl disulfide | Octacosyl disulfide |
| Decyl disulfide | Butyl decyl disulfide |
| Tetradecyl disulfide | Hexyl octyl disulfide |
| Pentadecyl disulfide | |

It will be noted that the retarder materials of this invention represent a departure from conventional antioxidant chemistry in that they contain neither aromatic nuclei nor antioxidant groupings such as secondary amine radicals nor do they contain additional groupings designed to sterically hinder the antioxidant grouping. The unsubstituted retarder materials of this invention afford protection to the polymer only in polymeric materials in which have been incorporated carbon black particles, no appreciable protection being afforded to the clear polymeric compositions.

The advantages gained by the use of the compositions of this invention will be appreciated by reference to the figures which on coordinates of oxygen uptake against time contain curves plotted from data taken from an accelerated test indicating the amount of oxygen absorbed by samples of polyethylene, some of which contain retarders and carbon in accordance with this invention.

Figure 2:
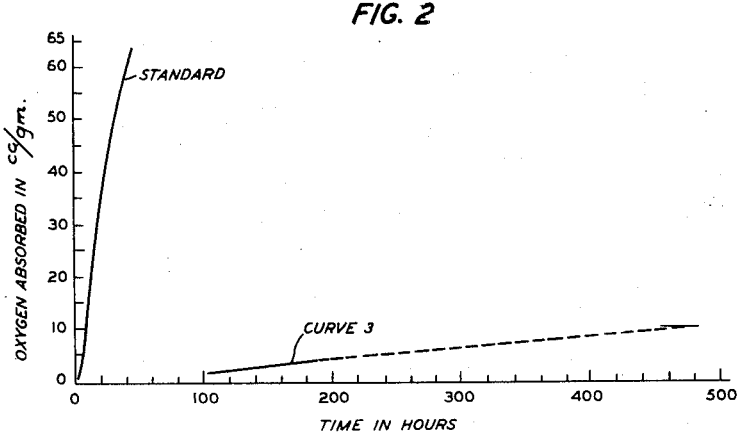

Fig. 1 contains three such curves for polyethylene; one corresponding sample containing no additives, one containing dodecyl disulfide and the third containing dodecyl disulfide and carbon black; and Fig. 2 contains two such curves for polyethylene: one for a sample containing no additives and the other containing a polymerization product of 1,10-decamethylene dithiol and carbon black.

The figures presented are representative of data taken from a standard accelerated aging test for polymeric materials. Such tests are well known and data taken therefrom is of known significance. To aid in the description of this figure, an outline of the accelerated testing procedure used is set forth below.

*Accelerated test procedure*

The saturated hydrocarbon polymer, which in all of the tests for which data is reported on the accompanying figures was polyethylene, together with a retarder and carbon black where required, was prepared by mill massing on a 6 inch by 12 inch two roll mill having roll speeds of approximately 25 and 35 r.p.m. with the rolls at a temperature at about 120° C. The polyethylene used in these studies was a commercial, high-molecular weight, high-pressure polymer supplied by the Bakelite Company as DYNK. This particular polymeric product finds widespread use in industry in such applications as cable sheathing and primary conductor insulation. Where carbon black was to be included, a master batch of polyethylene and 25 percent by weight of carbon black was first prepared by milling after which the concentration of carbon black was cut back to about 3 percent by dilution with additional polyethylene. This procedure was followed to insure good dispersion of the carbon black throughout the polymer. In instances where the melting point of the retarder under study was above 255° F., the master batch also contained an amount of such retarder in excess of the amount to be tested. In such instances, the excess of retarder was proportionally equal to the excess of carbon black so that the amounts of both additives could be reduced to the desired levels by the addition of polyethylene. Where the melting point of the retarder was below 255° F., it was added directly in the desired concentration to the diluted mix which already contained the desired amount of carbon black, special care being taken to avoid loss of retarder by evaporation.

Test sheets of the polymeric material containing both the retarder and the carbon black were molded to a thickness of approximately 50 mils, and 14-millimeter diameter disks were cut from these sheets. Four such disks, each in a shallow glass cup, were placed in a Pyrex glass tube attached to a mercury manometer together with about 2 grams of powdered barium oxide or similar absorbent. The reaction vessel, after being successively evacuated and filled with oxygen to assure a complete oxygen environment, was again filled with oxygen and was placed in an air-circulating strip-heater oven maintained at 140° C. and of such design as to assure a variation of no more than 1° C. throughout the entire volume in the oven. The reaction vessel was immediately connected to an oxygen gas burette with a short length of polyvinyl chloride tubing. After reaching temperature equilibrium at the said temperature of about 140° C. which took about 15 minutes, the system was adjusted to zero reading at atmospheric pressure. Readings of oxygen uptake were made as required at atmospheric pressure, one such reading being taken every 4 to 12 hours.

Referring again to Fig. 1, the coordinates are oxygen-absorbed in cubic centimeters per gram of sample as measured on the mercury-filled manometer on the ordinate, and time in hours on the abscissa. The plotted data was taken from a run in which the polymeric samples were maintained at a temperature of 140° C. Curve 1 is plotted from absorption data taken from a test conducted on a sample of polyethylene containing 0.1 percent of dodecyl disulfide and containing no dispersed carbon while curve 2 is plotted from data taken from a test run conducted on a sample of polyethylene also containing 0.1 percent by weight of the same retarder and in addition containing 3 percent by weight of dispersed carbon black particles. The "standard" curve corresponds to a sample of polyethylene containing no additives which was subjected to the same test conditions. In interpreting curves such as those depicted in the figure, it is here assumed that the useful properties of polyethylene and other polymeric materials included in the class set forth above are not critically affected until the amount of oxygen absorbed by the polymer is of the order of 0.5 percent by weight which is equivalent to about 10 cubic centimeters of absorbed oxygen in the ordinate units.

Examining curve 1 of the figure, it is seen that oxygen absorption proceeded rapidly from the start of the run attaining the critical limit of 10 cubic centimeters after about 44 hours. The rapid rate of oxidation indicated by this curve and comparison with the "standard" curve which attained this value after about 8 hours, shows that some protection was afforded the polymer by the dodecyl disulfide in the absence of carbon black. In contrast with the curve 1, it is seen from curve 2 that the polyethylene sample containing carbon black particles in addition to the same amount of the same retarder oxidized at a much slower rate and had absorbed 10 cubic centimeters of oxygen only after about 550 hours.

From Fig. 2 it is seen that whereas a sample of polyethylene containing no additives had absorbed 10 cubic centimeters per gram of oxygen after about eight hours ("standard" curve), incorporation into the polymer of 0.1 percent of a polymerization product of 1,10-decamethylene dithiol and 3 percent of carbon black particles resulted in a composition which had absorbed only 4.5 cubic centimeters of oxygen after 186 hours (curve 3). Although the exposure test had proceeded no further at the time of this writing, prior experience indicates a likelihood that subsequent readings will follow the extrapolated portion of the curve shown by a dashed line at least to an ultimate reading of 10 cubic centimeter-absorption of oxygen at about 470 hours. It is estimated that the polymerization product produced by iodine titration of the dithiol was of the order of a trimer.

It will be noted that there is a basic difference in form between curve 2 of Fig. 1 and the type of curve which generally results upon plotting data from such tests run on polymeric samples containing the common commercial antioxidants. With such inhibitors there generally results a distinct transition point separating two regions having different oxidation rates and therefore different slopes on such a plot. The first portion from the origin to the transition point, generally referred to as the "induction period," is interpreted as indicating that period during which the antioxidant prevents all autocatalytic breakdown, while the second region after the transition point, having a very steep slope, is considered to indicate that the antioxidant supply has been exhausted so that oxidation of the polymer proceeds substantially unhampered.

We consider that the curve form of curve 2 more nearly resembles the characteristic curve resulting from the incorporation of any of the class of antioxidants generally referred to as retarders in the polymer. Such materials in combination with such a polymer effect a change in its characteristic oxidation mechanism. Whereas, in the absence of a retarder, oxidation of any part of the polymeric molecule produces a chain reaction with a consequent rapid breakdown of the polymer, the presence of a retarder results in an oxidation mechanism such that an autocatalytic chain reaction does not result. Under such circumstances, oxidation, although it proceeds, does so at a slower rate thereby resulting in a curve form having a slope greater than zero but less severe than that resulting either in the absence of any antioxidant material or after the depletion of most commercial inhibitors. Furthermore, the fact that protection is afforded over so long a period of 550 hours of accelerated test during which time a large portion of the retarder present would have reacted at least once with the oxygenated radicals indicates that the reaction might be such as to cause regeneration of the retarder. It is expected that curve 3 of Fig. 2 will have the same general form as that of curve 2 of Fig. 1.

A postulated reaction which would explain the above results and which is consistent with known reactions follows:

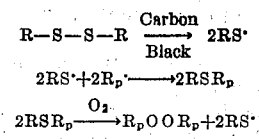

in which R—S—S—R is representative of the aliphatic disulfide retarders of this invention and $R_p$ represents a polymeric radical. Although the retarder is represented as a symmetrical molecule to simplify the reaction it is, of course, not intended to limit the invention to this class of compounds. The equation is intended as a general explanation of the reaction which occurs in any essentially saturated polymer containing tertiary hydrogen atoms containing one of the retarders of this invention in combination with carbon black particles.

As the equation indicates, breakdown of the retarder in the presence of carbon black results in the formation of the RS· radical which then retards oxidation of the polymeric chain to produce the $RSR_p$ structure which is then oxidized to regenerate the RS· radical together with the $R_pOOR_p$ structure. Apparently this $R_pOOR_p$ compound is fairly stable and does not result in the initiation of a chain reaction, such as is normally produced in a polymeric material such as polyethylene in the presence of oxygen.

Why the reaction set forth above does not occur in clear polyethylene is not known, although it is postulated that the RS· radical is produced only under the catalytic influence of carbon black. It should be especially noted that the equation above is offered only as a possible explanation of the retarder action in view of the known results, and dependence is in no way had upon it either as a basis for the specification or as substantiation of the claims herein.

As is amply set forth herein, although the invention has been primarily expressed in terms of specific retarders and specific amounts of carbon black in specific saturated hydrocarbon polymeric materials of the group containing tertiary hydrogen atoms, it will be recognized that the principles expressed herein are equally applicable to other retarders and polymers within the general formula and to the ranges of composition all of which have been set forth. For example, although one specific retarder reported herein is a symmetrical unsubstituted alkyl disulfide, unsymmetrical molecules work equally well as do those containing hydrocarbon substituents or other substituents known to be inert to the polymer on the alkyl radicals.

As has been also set forth, the class of polymeric materials which may be stabilized in accordance with this invention includes not only those materials in which tertiary hydrogen atoms appear in random fashion in numbers as small as perhaps 1 tertiary hydrogen atom for every 100 carbon atoms, but also includes those materials which by the nature of the monomer contain well ordered tertiary hydrogen atoms occurring at different intervals in numbers of up to one such atom for every two carbon atoms in the polymer chain.

What is claimed is:

1. A composition which is stabilized against oxidation comprising from 0.5 percent to 5 percent by weight of carbon black particles of a maximum size of 1000 angstroms, from .01 percent to 5 percent by weight of a compound containing at least one unit of the structure R—S—S—R' in which R and R' are alkyl radicals each containing from 4 to 30 carbon atoms, and an essentially saturated hydrocarbon polymeric material selected from the group consisting of polymers of ethylene, propylene, butene-1, 3-methyl pentene-1 and mixtures of any of these materials and in which all weight percents are based on the said composition.

2. The composition of claim 1 in which the polymeric material is a homopolymer.

3. The composition of claim 1 in which the polymeric material is a copolymer.

4. The composition of claim 1 in which the compound is dodecyl disulfide.

5. The composition of claim 1 in which the polymeric material is polyethylene.

6. The composition of claim 1 in which the compound is dodecyl disulfide and the polymeric material is polyethylene.

References Cited in the file of this patent

UNITED STATES PATENTS

| | | |
|---|---|---|
| 2,431,303 | Billmeyer | Nov. 25, 1947 |
| 2,501,792 | Smith | Mar. 28, 1950 |
| 2,512,459 | Hamilton | June 20, 1950 |
| 2,643,241 | Crouch | June 23, 1953 |
| 2,769,784 | Young et al. | Nov. 6, 1956 |
| 2,843,577 | Friedlander et al. | July 15, 1958 |